United States Patent
Fullerton, III (10) Patent No.: US 6,712,022 B2
(45) Date of Patent: Mar. 30, 2004

(54) LOBSTER PACKING BOX SYSTEM

(76) Inventor: Frederick D. Fullerton, III, 24 Irene Dr., Pelham, NH (US) 03076

( * ) Notice: Subject to any disclaimer, the term of this patent is extended or adjusted under 35 U.S.C. 154(b) by 9 days.

(21) Appl. No.: 09/997,074

(22) Filed: Nov. 29, 2001

(65) Prior Publication Data

US 2004/0000271 A1 Jan. 1, 2004

Related U.S. Application Data

(60) Provisional application No. 60/253,880, filed on Nov. 29, 2000.

(51) Int. Cl.$^7$ .......................... A01K 61/00; A47B 73/00
(52) U.S. Cl. ......................... 119/201; 211/74
(58) Field of Search ................ 119/201, 200, 119/203; 211/74; 206/205, 587, 370; 248/152

(56) References Cited

U.S. PATENT DOCUMENTS

| | | | | |
|---|---|---|---|---|
| 3,870,155 A | * | 3/1975 | Galloway | 211/74 |
| 3,958,359 A | | 5/1976 | Doughty | |
| 4,093,076 A | * | 6/1978 | Newton | 211/74 |
| 4,942,960 A | * | 7/1990 | Kawaguchi et al. | 206/205 |
| 4,971,275 A | * | 11/1990 | Roberts | 248/152 |
| 5,050,335 A | | 9/1991 | Hisey | |
| 5,218,923 A | | 6/1993 | LaRosa | |
| 5,370,245 A | * | 12/1994 | Tersch et al. | 211/74 |
| 5,390,815 A | | 2/1995 | Spiegel | |
| 5,555,845 A | | 9/1996 | Flynn | |
| 5,806,683 A | * | 9/1998 | Gale | 206/587 |
| 6,112,896 A | * | 9/2000 | Bal | 206/370 |

OTHER PUBLICATIONS

E–Corporate Gifts. Com, Web page http://www.e–corporategifts.com/lobster_shipping.html., Packaging and Shipping of Legal Seafood Lobsters, pp. 1–3 printed on Oct. 16, 2002.

Marko Foam Products, Inc., Web page, http://www.marko-foam.com/wine_shipping_container.htm, Wine Shipping Containers & Storage Solutions, pp. 1–6 printed on Oct. 16, 2002.

Marko Foam Products, Inc. Web page, http://www.marko-foam.com/insulated_containers.htm, Insulated Shipping Containers & Gel Pack Refrigerants, pp. 1–7 printed on Oct. 16, 2002.

Marko Foam Products, Inc. Web page, http://www.marko-foam.com/candlepack.htm, Protective Candle Packs, pp. 1 & 2 Information printed on Oct. 16, 2002.

Estrella, Bruce T., Techniques for Live Storage & Shipping of American Lobster, Department of Fisheries, Wildlife & Environmental Law Enforcement, Division of Marine Fisheries, Third Edition, Jul. 2002, pp. 1–18.

Truefoam, Web page, http://www.truefoam.com/styropack_lobster.html, Styropack Lobster/ Salmon Boxes, Styropack Salmon Boxes, pp. 1–3 printed on Oct. 16, 2002.

* cited by examiner

Primary Examiner—Thomas Price
(74) Attorney, Agent, or Firm—Maine & Asmus (57) ABSTRACT

A container system for packing live lobsters and other crustaceans has two sidewall components, and optional intermediate wall components, with mating faces formed with uniformly spaced vertical pockets. There may be a separable bottom component as well. The components may be separately molded for interchangeable fit, or cut out from a common core molding as a matched set. Together the y form an open top box, with pockets aligned to form open top cells for holding lobsters, tail first. A top is used to contain the live lobsters under a cooling gel pack or layer of ice. The closed box may be further enclosed in a sleeve and liner for additional security and protection against leakage. The box can be opened one component at a time, exposing only one layer of lobsters at a time, permitting easy inspection and removal of each lobster.

12 Claims, 6 Drawing Sheets

FIG. 7 of foamed polymers such as polystyrene (Styrofoam™) or similar low density, injection molded plastic. At first, the foam plastic was used as an outer wall or box, for its insulation value. Lobster are a live product, and must be kept continuously cool from the time caught, through initial processing, packing, shipment, retail handling and sale, to final delivery to the consumer's kitchen. Mortality of the lobsters while in the channel of distribution results from various problems, most of which can be generally labeled as heat damage. The need for effective insulation, in part, led to the development of a box produced and distributed under the trademark, Cloud Pack™, a mark and product with which this applicant is not associated.

LOBSTER PACKING BOX SYSTEM

This application relates and claims priority to pending U.S. patent application Ser. No. 60/253,880, filed Nov. 29, 2000.

BACKGROUND OF THE INVENTION

1. Technical Field of the Invention

This invention relates to containers for packing live lobsters and crustaceans for shipment by carriers of all types; and in particular to an insulated and compartmentalized container system for the orderly packing, shipping, and unpacking of live lobsters.

2. Background Art

For many years there has been a large demand for live lobsters at areas distant from where the lobsters are harvested. To satisfy this demand, lobsters have been packaged and shipped great distances, including shipment by air transport.

Initially lobsters were shipped in wooden crates and boxes. This was changed to a less expensive means such as wax boxes or curtain coated boxes. Eventually, boxes were produced of foamed polymers such as polystyrene (Styrofoam™) or similar low density, injection molded plastic. At first, the foam plastic was used as an outer wall or box, for its insulation value. Lobster are a live product, and must be kept continuously cool from the time caught, through initial processing, packing, shipment, retail handling and sale, to final delivery to the consumer's kitchen. Mortality of the lobsters while in the channel of distribution results from various problems, most of which can be generally labeled as heat damage. The need for effective insulation, in part, led to the development of a box produced and distributed under the trademark, Cloud Pack™, a mark and product with which this applicant is not associated.

The Cloud Pack™ box is a commercial embodiment of the design disclosed in LaRosa's U.S. Pat. No. 5,218,923, issued Jun. 15, 1993. It is a foam plastic packing system in the form of a three piece box; the preformed pieces consisting of a top section or cover, an intermediate section with an open top and bottom and two longitudinal partitions, and a lower section with vertically oriented, open top compartments. The three sections are all made of Styrofoam, and interlock with tongue and groove joints.

The top section dimensions are 14½ inches wide, 25 inches long and 3 inches high, with a 1 inch Styrofoam wall and top thickness, providing about two inches of depth within the cover section. The intermediate section dimensions are 14½ wide, 25 inches long, and 6 inches high with the two partitions about one quarter inch thick running from end to end, and with about a one and one half inch wall thickness around the sides. The bottom section dimensions are 14½ inches wide, 25 inches long, five inches high, with individual, open top, vertically oriented, square cells that are about four inches deep, suitable for tail first stuffing with a lobster of suitable size. The number of cells varies between box models. There are three types a 32 cell box, a 28 cell box, and a 21 cell box known to the applicant, the numbers generally varying inversely with the size of the lobster for which the box is intended.

| Cell Size | Lobster Size |
| --- | --- |
| 20 cell | 1½ pound lobster |
| 28 cell | 1¼ pound lobster |
| 32 cell | 1 pound lobster |

The Cloud Pack requires an aluminum jig fitting over the cell network of the bottom section, as a further upward extending partition used to keep the lobsters claws separated during the packing process. If the jig is lifted prematurely, even a small amount, lobster parts may spill underneath it and it will likely be impossible to reposition the jig to complete the fill. So the box must be emptied, the jig repositioned, and the box refilled again. When filled and closed, the box is banded for shipment. Some freight carriers will accept the box in this fashion; others require or prefer that it be enclosed and sealed in an outer shipping carton, to reduce the likelihood of leakage in transit.

When unloading the box at the retail end, after removal of the cover, the refrigerator ice pack or ice and wet paper, and the intermediate section of the box, the lobster's claws and head and upper body are exposed. The user must carefully lift each lobster from its individual compartment. If not done carefully claws can break away, in part because even under the most careful removal technique, the sharp edges of the lobster's tail may rake, rip and hold onto the foam cell partition, resisting the tug on its claws. Even when successful, the raking action is likely to cause small beads to break away and fragment from the compartment partitioning structure. This foam debris clings to the lobster, causing a further problem when the lobster is put into a tank or container containing a filtration system. The foam beads float on top of the water and tend to clog filters and pumps.

The first Styrofoam boxes, intended mainly for their insulation value, were open boxes into which the lobster were stacked horizontally, as they had been in the earlier wooden crates. Lobsters were laid down one on top of the other by various standard weights. Examples are listed below:

| Box Name | Box Weight |
| --- | --- |
| TP3 or TP30* | 25 to 30 pound Styrofoam boxes |
| TP40 | 40 pounds |
| TP50 or TP1 | 50 pounds |

*also known as the Canadian Shipper

The TP stands for Tech Pak which is a manufacturer of Styrofoam boxes. There are other companies that make or distribute these boxes using the initials of their company as the first two letters of the box. An example is Arjay National, with its AN30 and AN40 boxes.

Other companies make other foam boxes with various shapes according to their weight capacity, as an inner box component to their lobster packing system. All generally use the foam box as an insulating shell providing approximately ¾ inch wall thickness for insulation value. Once filled and closed, the foam boxes are inserted into a corrugated cardboard carton as the outer layer of the shipping container.

Other prior art providing context for an understanding of the disclosure that follows includes Flynn's U.S. Pat. No. 5,555,845, Container and Method for Transporting Live Crustaceans, issued Sep. 17, 1996; Spiegel's U.S. Pat. No.

5,390,815, Container with Adjustable Compartments, issued Feb. 21, 1995; Doughty's U.S. Pat. No. 3,958,359, Sportsman's Combination Receptacle and Ice Chest, issued May 25, 1976; and Hisey's U.S. Pat. No. 5,050,335, Minnow and Fish Preserving Container, issued Sep. 24, 1991.

Styrofoam boxes created a better packaging for the lobsters and other crustaceans. However, mortality problems were still a significant factor so alternative solutions were tried, cell packing probably being the most significant. Inside the various boxes, there is a celled partition system of squares, somewhat like a grid or honeycomb, commonly a set of crisscrossing cardboard partitions that is inserted into the box prior to filling. The partitioning system gives each lobster its own individual compartment or cell, preventing the crushing of lobsters by their collective weight and by jostling while in transit, which causes damage and ultimately some degree of mortality.

This new partition packing arrangement has basically taken over the packaging industry in specific areas such as loose freight or individual store deliveries. It is mostly used to provide the customer or end user a high quality live lobster. Further steps were taken to make an even stronger sturdier box or series of boxes known as the HDS series. Two of which are known as the HDS5 and HDS6. The HDS5 is used mostly as a plain Styrofoam box shipped to Japan. Basically it is the same as a TP40 except, slight different shape. Most importantly a thicker foam wall providing more insulation value is still used with a cell partition as is the HDS6.The HDS6 being a slightly taller box used with a thick outer corrugated and a 24 cell partition.

Although these foam box systems provide more insulation value that the older wooden crates, they still are not the ultimate solution to the packing problems a lobster company faces. Styrofoam boxes with cell partition seem to be the way to ship a better quality lobster with lower mortality, but they need to be incorporated together to provide even better shipping and greater ease of packing and unpacking of the lobsters, and elimination of the foam debris. These reasons will make the design of a new box more desirable for reasons of labor costs, mortality, ease of manufacturing and better handling at the retail end. Incorporating cell partitions and other benefits of injection molded components into a single box system is what the following design is all about.

SUMMARY OF THE INVENTION

It is an object of the invention to provide a box for packing, transporting, and unpacking live lobsters and other crustaceans, consisting of at least two sidewall components, each with a mating face, each mating face formed with at least one elongate, open top pocket. The two sidewall components are removably connectable at their mating faces to form an open top box, with the pockets aligned so as to form open top cells into which lobsters can be inserted tail first. There is also a top component which is removably connectable to the topside of the box formed by the joining of the two sidewall components face to face.

It is a further object of the invention to provide for the box at least one cell partition component with two mating faces, where each mating face is likewise formed with at least one elongate open top pocket. Each of the sidewall components is connectable to at least one mating face of the cell partition so as to have the assemblage of all components form an open top box. The top component in this case would be of a suitable size to fit the open top box with its cell partition layer between the sidewall components.

It is a yet further object of the invention that the at least one pocket on a mating face be four pockets uniformly distributed on the mating face.

It is another object of the invention that it be deconstructable during unloading so as to first remove the top, set the box on end, and then remove the upper sidewall so as to split open a first row of cells for inspection and removal of the first row lobsters, and then to remove subsequent layers of the box, exposing subsequent rows of lobsters for inspection and removal.

Other objects and advantages of the present invention will become readily apparent to those skilled in this art from the following detailed description, wherein we have shown and described only a preferred embodiment of the invention, simply by way of illustration of the best mode contemplated by us on carrying out our invention.

DESCRIPTION OF THE PREFERRED EMBODIMENT

Figure 1:
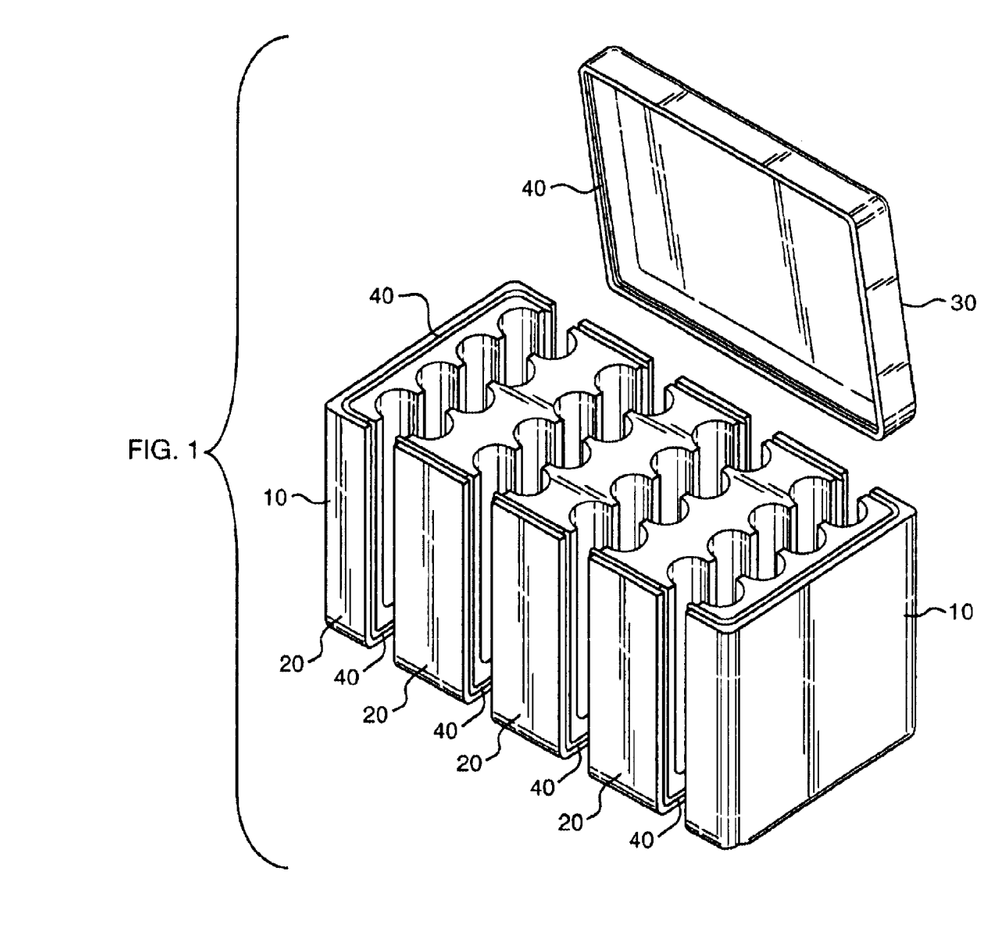
FIG. 1 is a perspective, exploded view of a preferred embodiment of the invention, utilizing reversible, common sidewalls, three common cell partitions, and a top, to form a 16 cell packing box.
Figure 2:
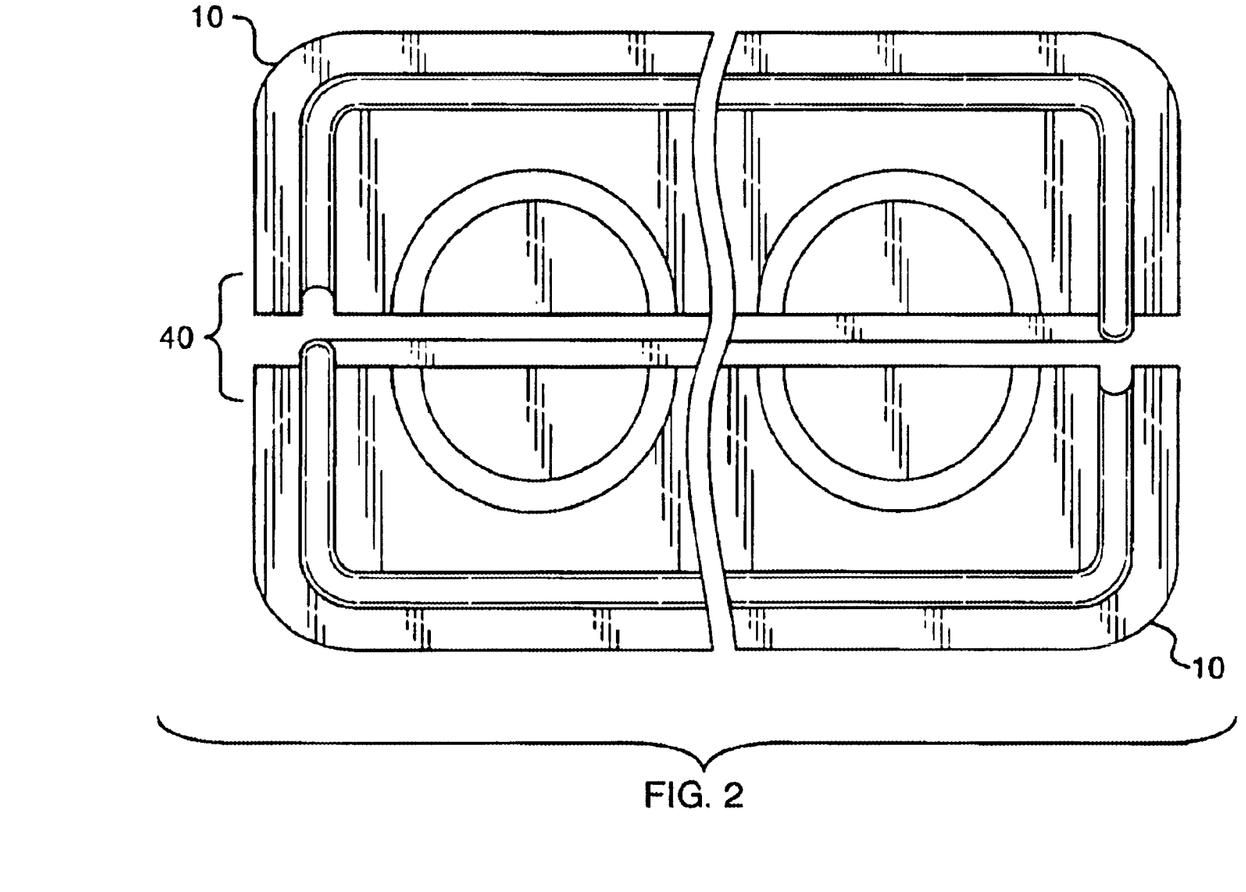
FIG. 2 is a split, top view of a pair of reversible sidewalls of the invention, illustrating the alternating left side, right side tongue and groove feature that permits use of a common sidewall.
Figure 3:
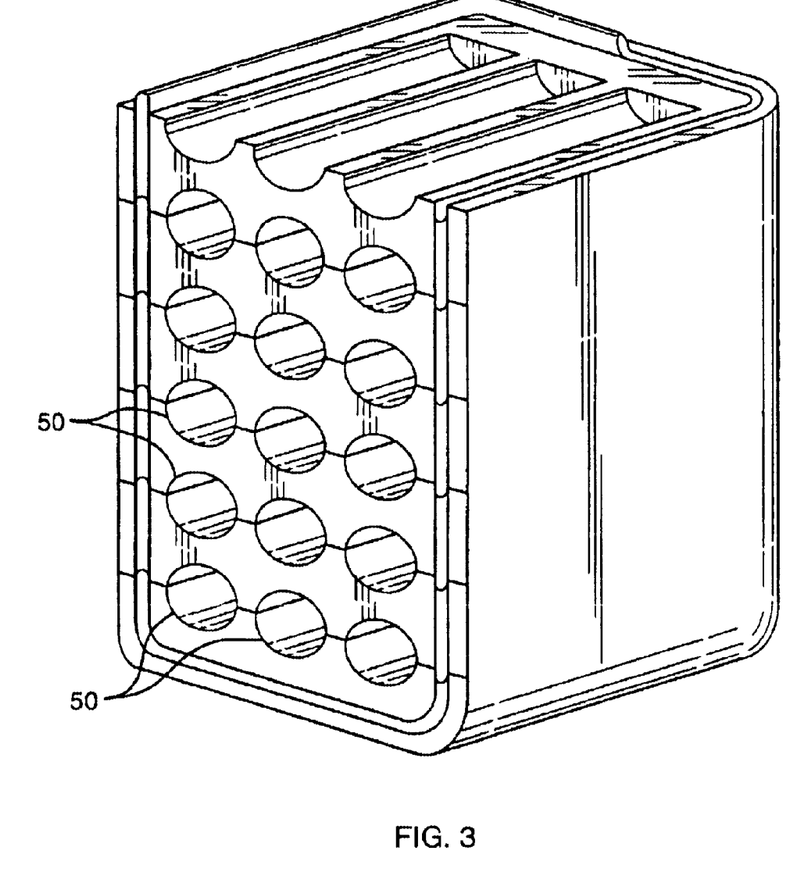
FIG. 3 is a perspective view of a packing box sitting on one end, from which the top and the other sidewall have been removed, illustrating the unpacking order for exposing one row at a time for easy removal.

Referring generally to FIGS. 1–3, a preferred embodiment of the invention has a foam packing box component, consisting of eight interlocking pieces which all join together in a tongue and groove fashion. The assembled box is 22 inches wide, 15¾ inches long, and 14 inches high, and contains cells for 24 lobsters. The pieces are fabricated of polystyrene or other low density, injection molded plastic foam. The design incorporates a honeycomb-like web of cell partitions, which when the box is assembled, gives each lobster its own molded foam sleeve.

The eight pieces of the preferred embodiment consist of only three unique components: a side wall, of which two are used; a cell partition, of which five are used; and a top, of which one is used. These components are illustrated in FIG. 1 as side wall 10, cell partition 20, and top 30. The FIG. 1 embodiment uses only three cell partitions 20, but the principle is the same. A side wall is a unitary block of injection molded plastic foam four inches wide and 15¾ inches long, with 4 half moon circles or semi-circular cylindrical sections formed 11½ inches deep, open at the top and on a common face and narrowing slightly as they go down. The FIG. 3 embodiment uses only three cells 50 per row, but the principle is the same.

Illustrating the basic characteristics and flexibility inherent in the component design, two of the side walls can be joined directly together, face to face, the half cells of each face together forming four circular cells 50 of about 3 inches top diameter, tapering to about 2½ inches diameter at the bottom, so as to have a 4 cell box eight inches wide and 15¾ inches long. FIG. 2 illustrates the coupling of a pair of side walls 10, face to face. There is about one and one half inch of insulating foam underneath and on all four sides of the network of cells. To complete this four cell embodiment would require an eight by 15¾ inch formed top, not part of the three component embodiment described but fully within the scope of the invention as the third or a fourth component, enabling the assembly of a four cell box when desired.

The cell partition component of the preferred embodiment is a unitary block of injection molded material four inches wide and 15¾ inches long, with mating tongue and groove features 40 on the side and bottom of the two 15¾ inch faces for mating to the side walls, each face further formed for cells with the same four semi-circular cylinder openings running down on each side about 11½ inches deep, open on the top side with about a 3 inch diameter, open in cross section on the face of the block, and tapering somewhat to about a 2½ inch diameter as you go from top to the closed bottom end. The spacing and partition thickness between the cells is the same as for the side walls; the insulating foam thickness at the four inch walls is about one and one half inch, corresponding to that of the side walls.

The tongue and groove interlocking detail 40 of the preferred embodiment, evident in the details of FIG. 2, is configured to permit either face of a cell partition component to mate with either face of another cell partition component or to the mating face of a side wall component. The common mating face scheme provides that the U shaped perimeter of the mating face is divided left and right so as to have one side configured with a tongue or male structure of the tongue and groove scheme, and the other side configured with the mating groove structure of the tongue and groove scheme. Either face of a cell partition component will present the same orientation of alternating tongue and groove to a side wall component or to another cell partition component.

One or more of the cell partitions, this particular embodiment described as using five partitions, can be assembled between pairs of side walls, forming boxes with increments of four cells, or such number as is desirable, up to the weight and size limit of the design. The top of the box for the preferred 24 cell embodiment, is one and one half inches thick, 28 inches long, and 17 inches wide, with a 2½ inch height or lip which contributes to the common headspace within the box required for the ice, a feature specific to the prior art of lobster lacking boxes in this respect. After the open, 24 cell box has been assembled and filled with lobsters, and covered with ice, the lop component is applied with a tongue and groove feature 40 to enclose the lobsters within the assemblage of side walls and cell partitions, creating a full, closed, foam lobster packing box. The foam box is then inserted endwise into a thin corrugated cardboard sleeve to keep the components locked together. The corrugated sleeve box is configured with a plastic liner, which is sealed after the foam box is in place, to avoid leakage.

It will be apparent that the lined sleeve and the foam top are unique to each size of box that is desired. While a manufacturer or distributor may produce and inventory a wide range of assembled box sizes, users will likely select one or two sizes to inventory at the local level.

As will be readily apparent to those skilled in the art, the width of the box, and the number and size of the cells in a row, and the total number of rows can be increased or decreased from that of the preferred embodiment. However, a limitation of the common mating face approach of the preferred embodiment is that the pattern of cells in system defined by one row of cells per reversible component, is limited to a rectangular grid-like pattern. This is so that the reversing of a cell partitioning section will retain the same positioning of the cell pockets for proper match up to the cell pockets of the mating component. An alternative scheme provides for unidirectional tongue and groove mating components, and two different, alternating, cell partitions so that a staggered row, more closely packed cell pattern can be achieved. This and many other variations in the cell distribution, partition layers and mating configurations, are within the scope of the invention.

The basic components with various size tops and sleeves can be inventoried and assembled for any size box within the scope of the design, in increments of four cells or whatever standardized box width and cell row count is selected as the basis for all the components. However, the invention is novel and important in a number of additional ways. You need no tools to pack the box, as it is normally supplied to the lobster processor fully assembled, and has no separate cell partition structure that must be installed or that might become misaligned or lifted during packing. The cell partitioning is integral to the box. This makes the box lighter, cheaper, and with the maximum insulating value compared to other shell-type boxes with partition inserts.

But the most desirable reason for using the invention is the way it unpacks. After taking off the cardboard sleeve and liner, then removing the cover and the gel pack or ice and wet paper, the box is turned up on one side wall and the box can be disassembled one layer at a time, fully exposing each row of four lobsters, each laid out it its own semi-circular cell pocket or trough for easy inspection and removal. Each lobster is easily viewed and removed from its pocket without risk of tearing off its claws or raking foam debris off the cell wall as in the prior art case. FIG. 3 illustrates this principle.

Referring now to FIGS. 4–7, another preferred embodiment of the invention has a foam packing box component, cast as one piece, and hot wire sawn lengthwise into four interlocking partition pieces and a bottom member, which are all kept mated together at their sawn joints. The assembled box is about 22 inches wide, 15 inches long, and 14 inches high, and contains rectangular cells for 24 lobsters. The cover is formed separately, with provision for tongue and groove mating to the box component. As in the prior art and in other embodiments of the invention, the cover and the box when assembled provide a common headspaee 26, by which the cooling effects of the ice pack are communicated to the vertically elongate open top pockets or cells 24. Provisions for headspace 26 are clearly illustrated in FIGS. 1, 5, 6, and 7. The pieces are fabricated of polystyrene or other low density, injection molded plastic foam. The design incorporates a honeycomb-like web of cell partitions, which when the box is assembled, gives each lobster its own molded foam sleeve.

Figure 4:
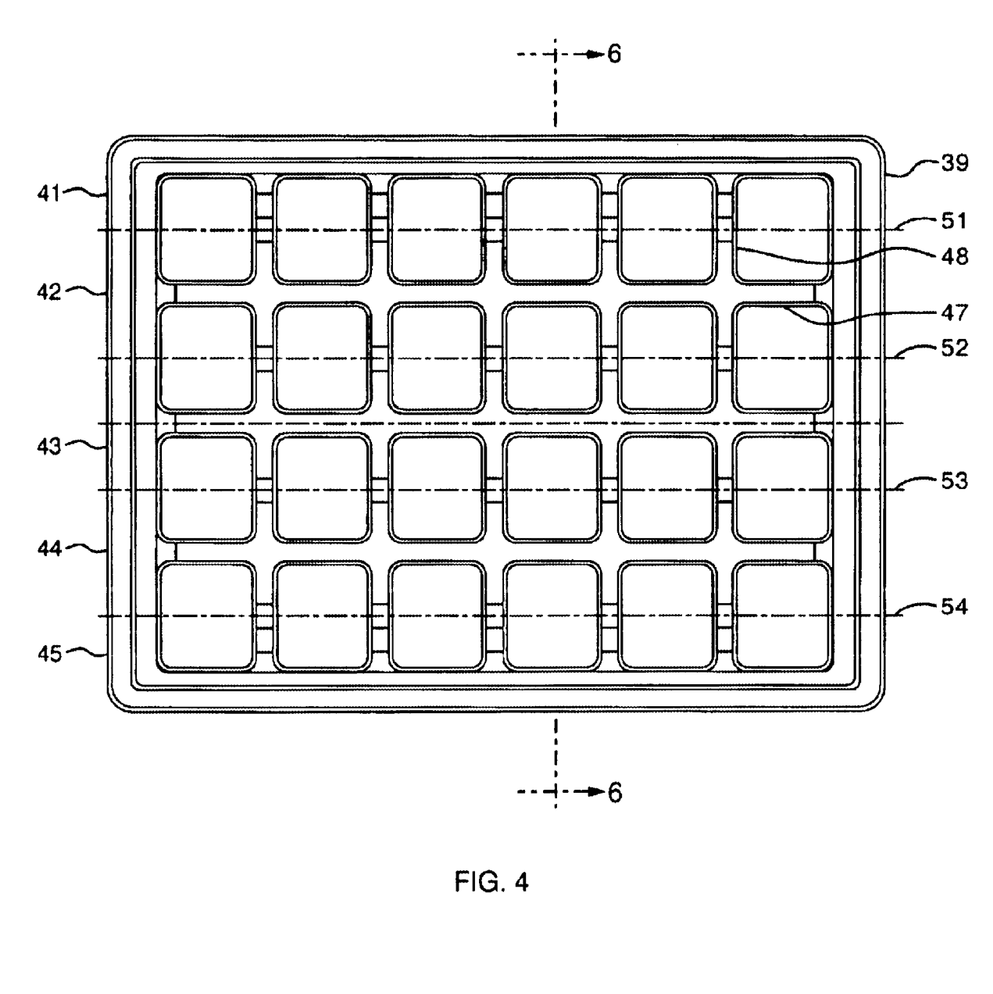
FIG. 4 is a top view of another preferred embodiment box of the invention, illustrating a four by six array of cells.
Figure 5:
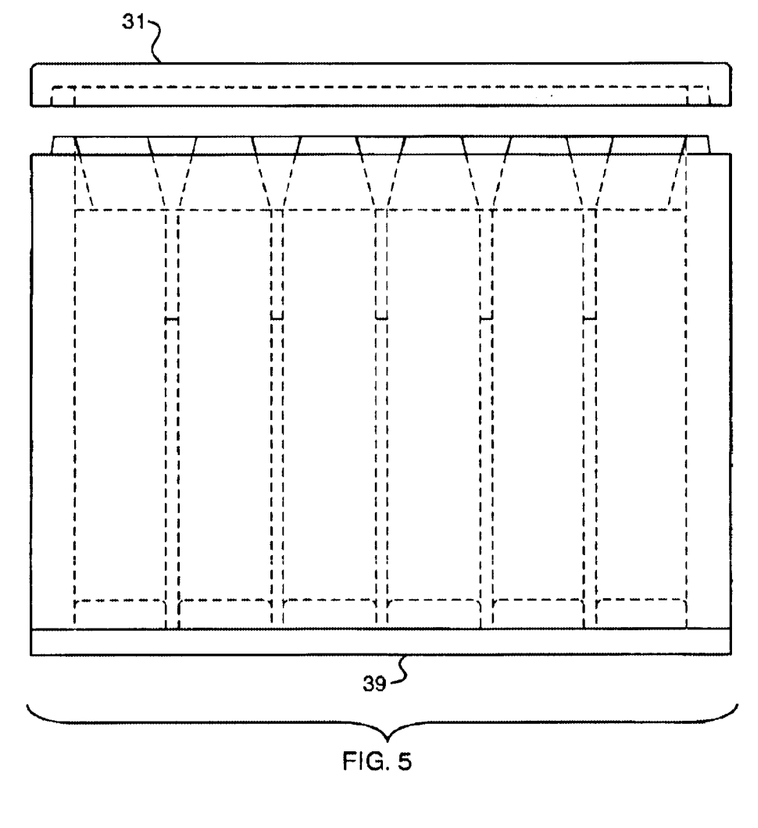
FIG. 5 is a lengthwise cross section view of the box of FIG. 4, together with a matching top.
Figure 6:
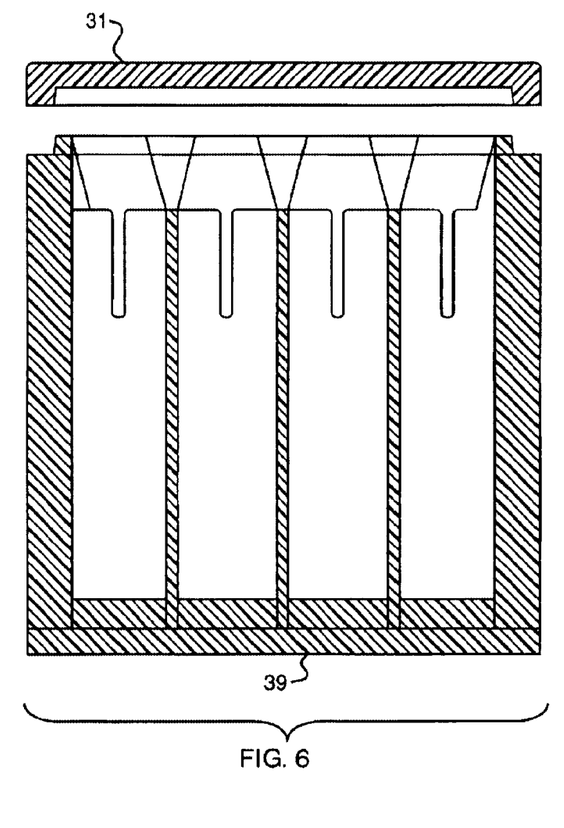
FIG. 6 is a spanwise cross section view of the box of FIG. 4, together with the matching top of FIG. 5.
Figure 7:
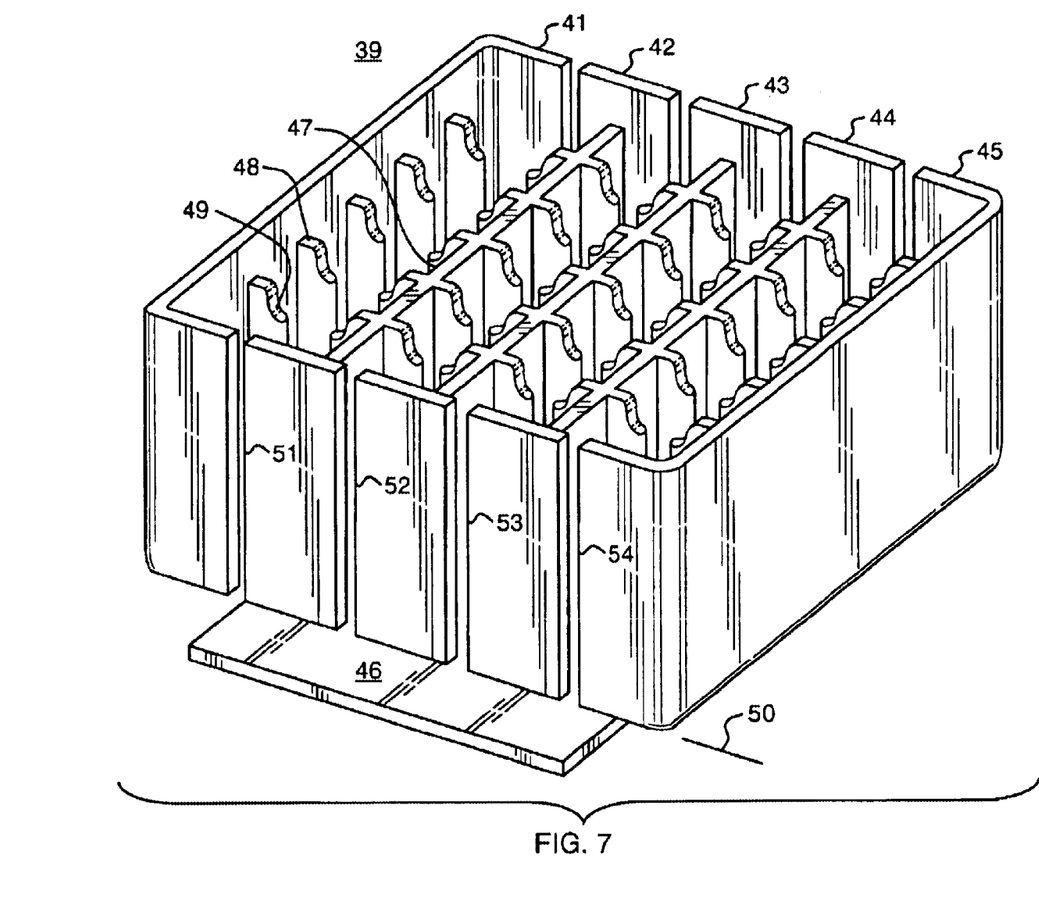
FIG. 7 is a perspective, exploded view of the box of FIG. 4.

The six pieces of this preferred embodiment consist of two side walls; two partitions; and a bottom, which are formed in matched sets from a common original one piece box, and the top member 31, an interchangeable piece similar to top 30 of the prior embodiment FIG. 1. The sawn components are illustrated in FIG. 7 as side walls 41 and 45, cell partitions 42–44, and bottom 46. Referring to FIGS. 4–6, the box starts out as a unitary block of injection molded plastic, with a four by six array of 24 square tubular, open top cells extending about 11½ inches deep, with generously rounded corners, in which the lobsters are eventually stowed for shipment. The long wall partitions 47, spanning six rolls of cells, are of uniform height. The short wall partitions 48, extending across four rows of cells, have about a three inch deep notch from the top down, providing extra finger or tool room for inserting and extracting lobsters.

The bottom 46 is sawn off as a complete panel along horizontal cut line 50, side walls and partitions 41–45 are wire sawn along generally vertical cutting line 51–54. Vertical cutting lines 51–54 are curved into slight arcs, providing a keyed aspect to the cut line that facilitates alignment and avoids inadvertent misassemble. Considered separately, the sawn components are readily identifiable as analogous to the components of the first embodiment, with the sidewalls and cell partitions having respective open side cell pockets which when the parts are mated, form the open top cells described.

It should be noted that the sawn separate bottom panel of the second embodiment is distinguished from the first embodiment wall panels which have cell bottoms integral to the cell pockets of the cell partition configuration, but these two features are interchangeable at the design stage, and both are within the scope of the invention. In other words, a variation of the first embodiment might have a formed bottom component, and a variation of the second embodiment might not require a sawn bottom component.

These parts are then bound together tightly at their respective sawn joints by a plastic sheath into an integral box container. The partition thickness is uniformly the same between cells. The sawn joints have a non-slip interface characteristic that inhibits any displacement of interior short wall sections within the box as it is being filled, and retains its full insulating and protective buffer function.

While the practice is that the sawn component parts be retained as a matched set in the completed box, the precision with which these parts are produced enables them to be interchanged with the like parts from other boxes off the same production line. Hot wire sawing is a commonly used technique for reducing and shaping larger blocks of foam materials into desired sizes and shapes, but any technique of cutting or sawing one block of material into two useable pieces so as to produce a uniform joint line by which the two parts can be easily mated, is within the scope of the invention.

After the open, 24 cell box has been assembled and filled with lobsters, and covered with ice, the top component is applied with a tongue and groove feature to enclose the lobsters within the assemblage of side walls and cell partitions, creating a full, closed, foam lobster packing box. The foam box is then inserted endwise into a thin corrugated cardboard sleeve to keep the components locked together. The corrugated sleeve box is configured with a plastic liner, which is sealed after the foam box is in place, to avoid leakage.

As will be readily apparent to those skilled in the art, the width of the box, and the number and size of the cells in a row, and the total number of rows can be increased or decreased from that of the preferred embodiment. The limitation of the prior embodiment to a rectangular grid of cells is not applicable here, where the sawn components are retained in their original configuration for the filling and shipping phases of box use. For example, there could be a box with a single roll of cells, split once by a sawn joint so as to be openable for presentation and selection of the lobsters at the destination or place of retail distribution. Such a box might have only two side wall panels. And whether there be one or more rolls of cells, the bottom need not be sawn for separation in embodiments where the wall members are sawn all the way through the bottom layer of the box.

As in the prior embodiment, no tools are needed to pack the box of this embodiment, as it is normally supplied to the lobster processor fully assembled, and has no separate cell partition structure that must be installed or that might become misaligned or lifted during packing. The cell partitioning is integral to the box. This makes the box lighter, cheaper, and with the maximum insulating value compared to other shell-type boxes with partition inserts.

But again, in this and all embodiments, the most desirable reason for using the invention is the way it unpacks. After taking off the cardboard sleeve and liner, then removing the cover and the gel pack or ice and wet paper, the box is turned up on one side wall and the box can be disassembled one layer at a time, fully exposing each row of six lobsters, each laid out it its own cell pocket or trough for easy inspection and removal. Each lobster is easily viewed and removed from its pocket without risk of tearing off its claws or raking foam debris off the cell wall as in the prior art case.

While the preferred embodiments presented are of molded foam construction, preferably polystyrene, any other materials with adequate structural and insulating qualities can be used, and other methods than molding and cutting or hot wire sawing, including machining with hard tools or lasers or the light or combinations thereof.

In summary, the invention provides a better packing system for lobsters that permits the production of a range of box sizes utilizing common principle components, a box with deeper cells that is more easily loaded, a more substantial partition structure between cells, and a row by row exposure of cells at unloading that splits the cell lengthwise for horizontal display of the lobster and easy removal without damage to the lobster and without the raking off and clinging of cell wall material to the lobster.

Other examples of the invention will be readily apparent to those skilled in the art for example, there is a packing box for lobsters and other crustaceans, consisting of at least two side walls, each with a vertical mating face and a top mating face, each vertical mating face formed with at least one vertically elongate open top pocket. The two side wall components are removably connectable at the vertical mating face into an open top box with opposing pockets aligned in pairs forming open top vertical cells for the lobsters or other crustaceans.

There may be at least one cell partition wall with two opposing vertical mating faces, where each vertical mating face is likewise formed with at least one vertically elongate open top pocket, and each side wall component is connectable to one of the mating faces of the cell partition wall.

Of course, there will be a top that is removably closable over the top mating face of the box. There may be six pockets, or more, or less, uniformly spaced along each mating face. Also, the vertical mating faces may be configured with a mating channel and flange structure or configuration that extends along the sides and bottom of each wall section so as to better align and seal them. And the box may be fabricated of molded polystyrene.

As another example of the invention, there is a method for making a packing box for lobsters and other crustaceans, that includes the steps of forming a box with sides and a bottom and an integral webwork of partitions that form a open top vertical cells, cutting the box along a vertical cut line extending through the box from one side to the other, into at least two wall parts where each part contains at least one vertical pocket portion of at least one of the vertical cells, and removably binding the parts together at the vertical cut line such that parts may be later separated to expose one row of lobsters or other crustaceans at a time for easy inspection and removal.

There may be an array of vertical cells in the box. There may be two side or outer wall parts and at least one cell partition wall part, and preferably three cell partition wall parts.

The method may include a step for cutting a bottom panel or part off the box along a horizontal cut line. The bottom panel may be cut so as to contain the bottom portion or surface of the vertical cells, or it might be cut lower for structural or other reasons relating to the geometry of the design. Of course, the box may be a foam box, and the cutting may be done by hot wire sawing techniques.

As yet another example of the invention, there is a packing container system for lobsters and other crustaceans, that includes an open top box containing an array of open top vertical cells and a matching box top, where the box and top are of molded foam construction. The box consists of two side wall parts and at least one partition wall part cut along vertical cut lines from a common molded foam component so as to expose vertical mating faces on each part. Each vertical mating face has at least one vertically elongate open pocket, where the pocket is a portion of an open top vertical cell as it was divided by one of the vertical cut lines. The box parts are removably connectable at their vertical mating faces with their pockets aligned as to reform the open top vertical cells. And the top is removably closable on the box.

There may be a bottom part cut along a horizontal line from the common molded foam component so as to expose a horizontal mating face on the bottom part and an opposing bottom side mating face on each of the wall parts. The bottom part may contain the bottom surfaces of the cells, depending on where the horizontal cut line is drawn.

There may be a sealing flange around the topside perimeter of the box and a mating sealing flange around the underside perimeter of the top. The system may also include an outer plastic sealing bag and a corrugated box enclosure to fully secure the box.

Other embodiments and variations within the scope of the specification, figures and claims that follow, will be readily apparent to those skilled in the art.

I claim:

1. A packing box for lobsters and other crustaceans, comprising:
    at least two opposing side walls, each with a vertical mating face and a lid mating face, each said vertical mating face formed with at least one vertically elongate open top pocket;
    at least one cell partition wall with two opposing said vertical mating faces, each said vertical mating face likewise formed with at least one said vertically elongate open top pocket, each said side wall component being connectable to at least one said mating face of said cell partition wall opposing said pockets aligned in pairs forming open top vertical cells for said lobsters and other crustacens;
    wherein all said walls are fabricated of insulating foam; and
    a lid, said lid removably closable over the lid mating face of said open top box so as to form a common headspace, said open top vertically elongate pockets communicating with said common headspace.

2. A packing box for lobsters according to claim 1, said at least one pocket being six pockets uniformly spaced along said mating face.

3. A packing box for lobsters according to claim 1, said vertical mating faces being configured with a mating channel and flange structure extending along the sides and bottom thereof.

4. A packing box for lobsters according to claim 1, said box fabricated of molded polystyrene.

5. A packing container system for lobsters and other crustaceans, comprising
    an open top box containing an array of open top vertical cells and a matching box lid, said box and said lid being of molded foam construction, said box consisting of two side wall parts and at least one partition wall part cut along vertical cut lines from a common molded foam component so as to expose vertical mating faces, each said vertical mating face having at least one vertically elongate open pocket, said pocket being a portion of a said open top vertical cell divided by said vertical cut line, said parts being removably connectable at said vertical mating faces with said pockets aligned as said open top vertical cells, said lid being removably closable on said box so as to form a common headspaee, said open top vertical cells communicating with said common headspace.

6. A packing container system for lobsters according to claim 5, further comprising a bottom part cut along a horizontal line from said common molded foam component so as to expose a horizontal mating face on said bottom part and a bottom side mating face on each of said wall parts.

7. A packing container system for lobsters according to claim 6, said bottom part comprising bottom surfaces of said cells.

8. A packing container system for lobsters according to claim 5, comprising a sealing flange around the topside perimeter of said box and a mating scaling flanged around the underside perimeter of said lid.

9. A packing container system for lobsters according to claim 5, said array of open top vertical cells being a four by six array.

10. A packing box for lobsters according to claim 5, said wall parts having six said pockets uniformly distributed along each said vertical mating face.

11. A packing container system according to claim 5, said box and said lid constructed of molded polystyrene.

12. A packing container system according to claim 5, further comprising an outer plastic scaling bag and a corrugated box enclosure for said box and lid.

* * * * *